US008238828B2

(12) United States Patent  
Chava

(10) Patent No.: US 8,238,828 B2  
(45) Date of Patent: Aug. 7, 2012

(54) SYSTEM AND METHOD FOR MULTIMEDIA STORING AND RETRIEVAL USING LOW-COST TAGS AS VIRTUAL STORAGE MEDIUMS

(76) Inventor: Ven Chava, Herndon, VA (US)

( * ) Notice: Subject to any disclaimer, the term of this patent is extended or adjusted under 35 U.S.C. 154(b) by 520 days.

(21) Appl. No.: 12/555,268

(22) Filed: Sep. 8, 2009

(65) Prior Publication Data

US 2009/0325640 A1    Dec. 31, 2009

Related U.S. Application Data

(63) Continuation-in-part of application No. 12/078,978, filed on Apr. 9, 2008.

(51) Int. Cl.  
*H04B 7/00* (2006.01)

(52) U.S. Cl. ............... 455/41.2; 455/41.1; 455/41.3; 340/12.5; 340/12.51; 340/13.25; 340/13.26

(58) Field of Classification Search ............ 455/41.1, 455/41.2, 41.3; 340/12.5, 12.51, 13.25, 13.26  
See application file for complete search history.

(56) References Cited

U.S. PATENT DOCUMENTS

| | | | |
|---|---|---|---|
| 5,418,354 A * | 5/1995 | Halling et al. ............. 235/383 |
| 7,592,917 B2 * | 9/2009 | Quan et al. ............. 340/572.1 |
| 7,934,658 B1 * | 5/2011 | Bhatti et al. ............. 235/462.45 |
| 8,054,163 B2 * | 11/2011 | Bayley et al. ............. 340/10.42 |
| 2005/0099307 A1 * | 5/2005 | Gilfix et al. ............. 340/573.1 |
| 2007/0000989 A1 * | 1/2007 | Kadaba ............. 235/375 |
| 2007/0052525 A1 * | 3/2007 | Quan et al. ............. 340/10.4 |
| 2007/0194926 A1 * | 8/2007 | Bayley et al. ............. 340/572.1 |
| 2008/0186141 A1 * | 8/2008 | Carmeli et al. ............. 340/10.1 |
| 2009/0170484 A1 * | 7/2009 | Bayley et al. ............. 455/414.2 |
| 2011/0095890 A1 * | 4/2011 | Bayley et al. ............. 340/572.1 |

* cited by examiner

*Primary Examiner* — Fayyaz Alam  
(74) *Attorney, Agent, or Firm* — PCT Law Group, PLLC

(57) ABSTRACT

Systems, methods and computer program products for storing, securing, identifying, authenticating and retrieving multimedia messages using low-cost barcode or RFID tags are disclosed. Additionally, a set of software features facilitate the easy and intuitive storage and retrieval of multimedia information using a mobile telephone acting on the media tags. Such tags can be attached or affixed to physical, real-world objects thus allowing multimedia messages associated with the tags to be retrieved with the real-world objects in a time-shifted and space-shifted manner from when and where they were recorded. The present invention uses low-cost (metal, paper or plastic) tags—encoded using barcodes or RFID—as virtual message storage units and commercially-available terminals equipped with appropriate software and sensors, such as mobile telephones, as recording and reading devices.

12 Claims, 13 Drawing Sheets

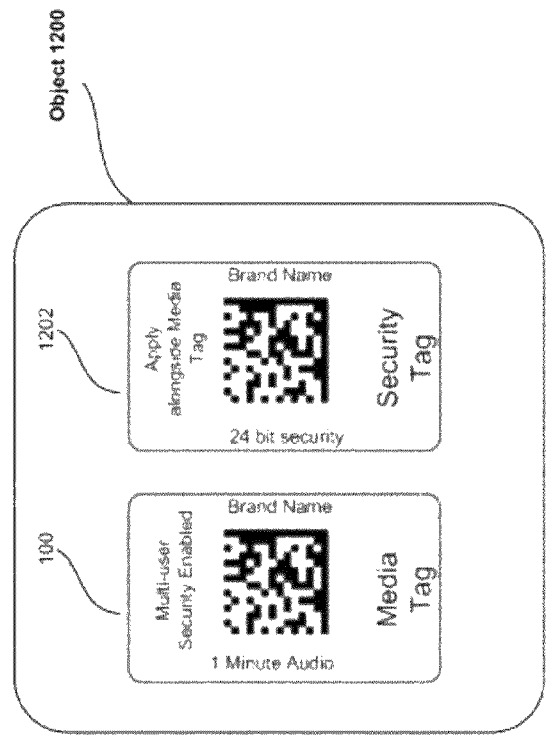
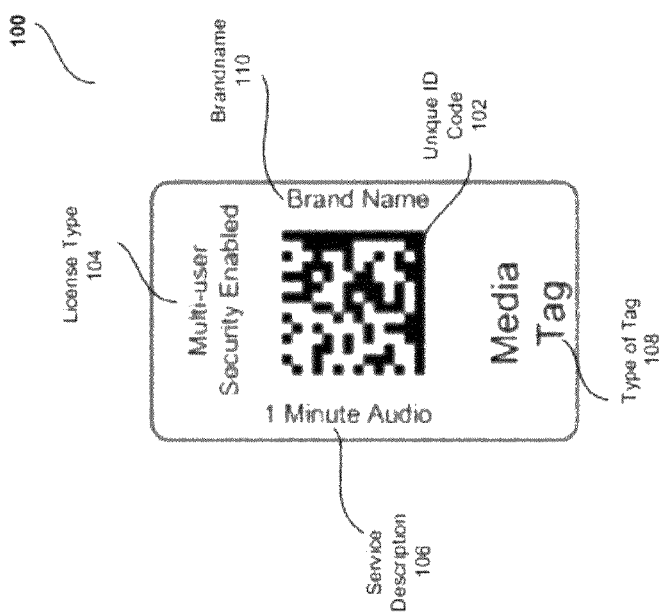
Fig. 12
Fig. 1

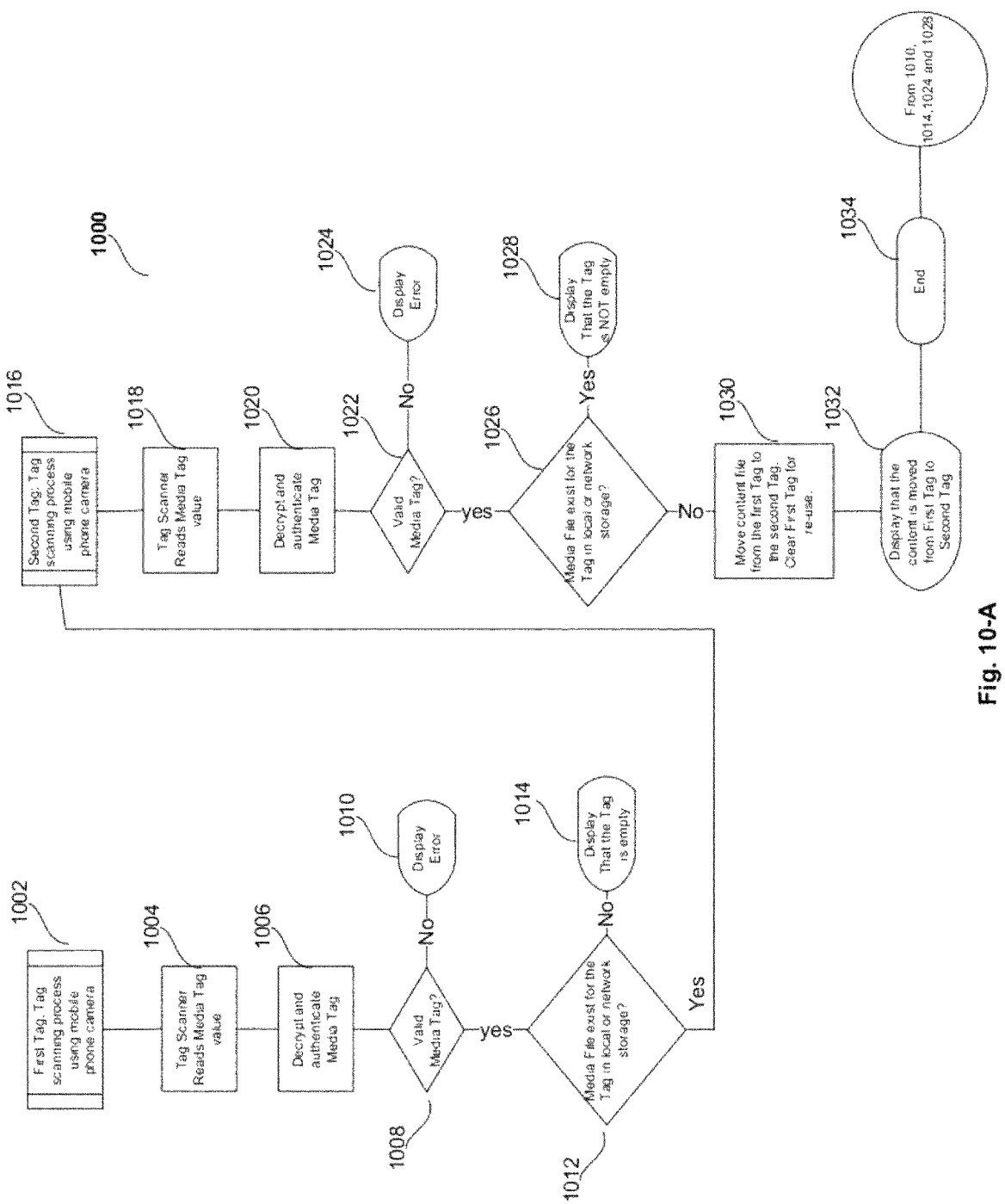
Fig. 10-A

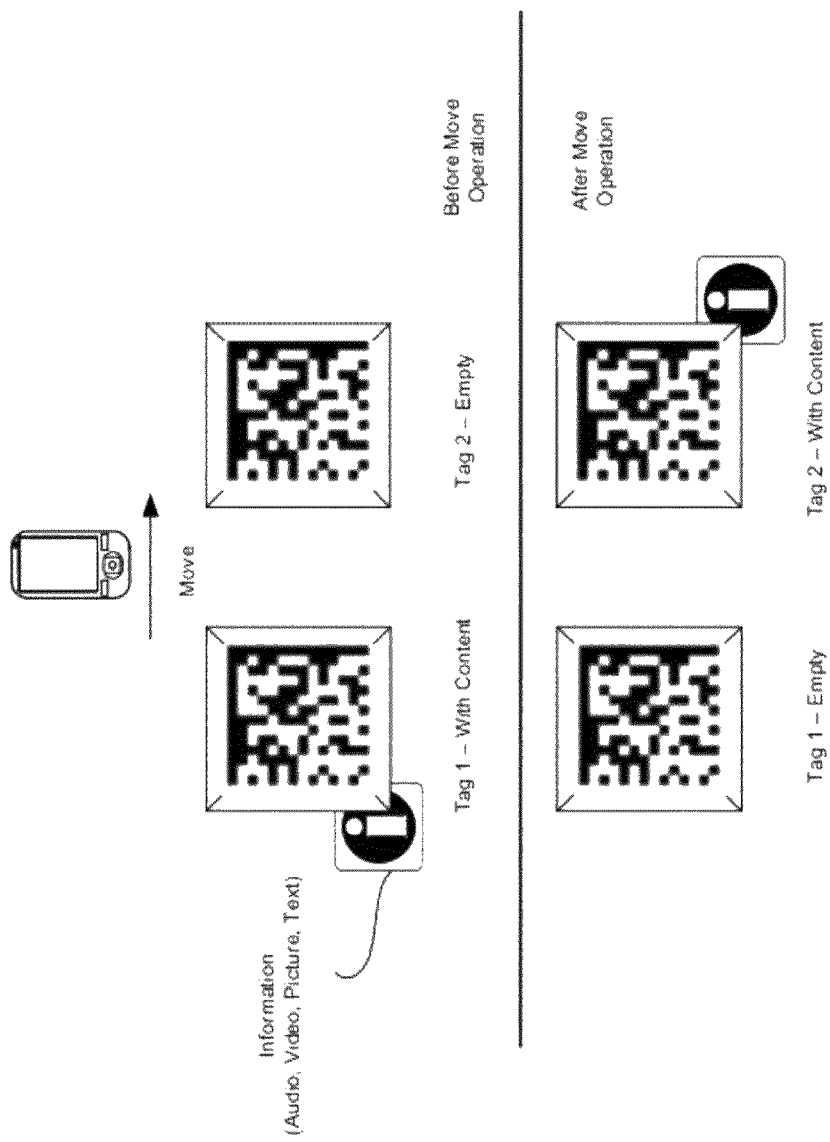
Fig. 10-B

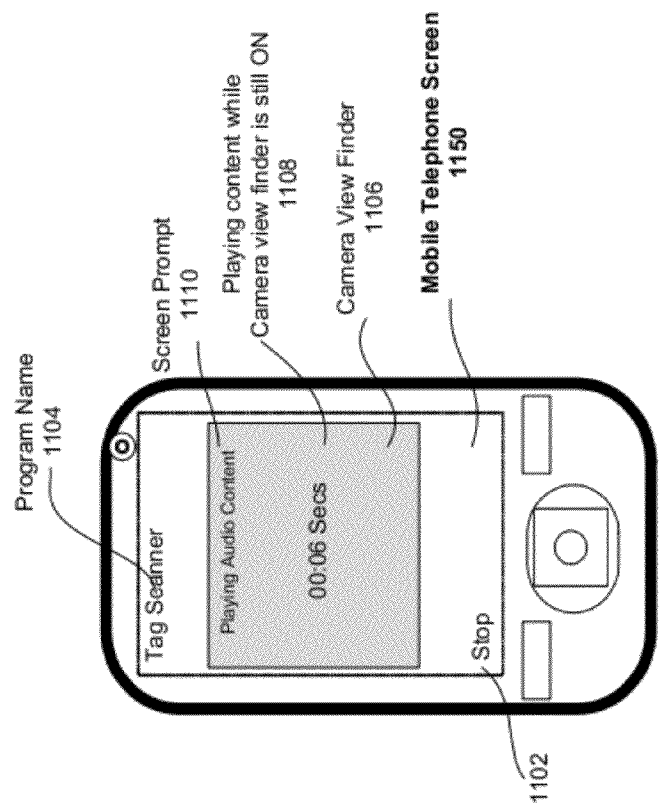
Fig. 11-B
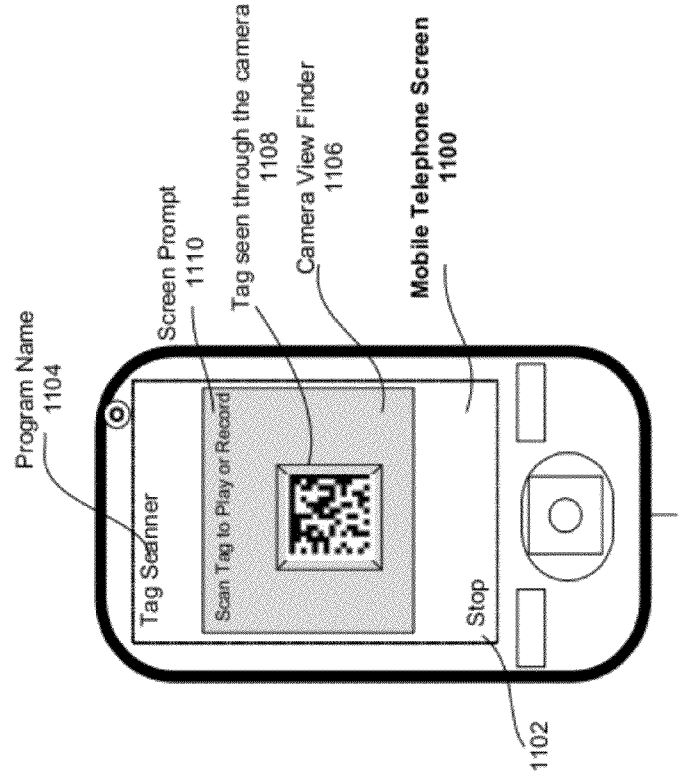
Fig. 11-A

SYSTEM AND METHOD FOR MULTIMEDIA STORING AND RETRIEVAL USING LOW-COST TAGS AS VIRTUAL STORAGE MEDIUMS

CROSS-REFERENCE TO RELATED APPLICATIONS

This Application claims the benefit, and is a continuation-in-part, of Applicants' co-pending U.S. patent application Ser. No. 12/078,978 titled, "System And Method For Storing And Retrieving Multimedia Messages On Low-Cost Tags In Order To Facilitate Contextual Communications," filed on Apr. 9, 2008, which is incorporated by reference herein in its entirety.

BACKGROUND OF THE INVENTION

1. Field of the Invention

The present invention generally relates to systems, methods and computer programs for the storage, security, identification, authentication and retrieval of multimedia information using low-cost barcode or radio frequency identification (RFID) tags.

2. Related Art

In today's technological environment, electronic communications mechanisms can be classified as either Person-to-Person (P2P), Unidirectional, Annotated, Social, Bulletin Board or Machine-to-Machine (M2M) communications. This classification system is based on the type of participants in the communications and usage patterns.

The above-described mechanisms of electronic communications, while they allow for rapid on-line/electronic communications, all have one deficiency. That deficiency is that they do not allow themselves to be associated with a physical (i.e., real world, non-virtual) context. For example, it would be very valuable to attach a voice message to a (tangible) gift, whereby the recipient of the gift can then easily retrieve the message when receiving the gift. Current mechanisms of sending messages with a gift include a printed or written communication in the form of a short note or a greeting card. There is no "electronic" way to "attach" a message with the physical context. While certain "clumsy" mechanisms can be thought of—such as sending an audio tape or player with the gift or writing a note containing a URL where an electronic message may be downloaded—there is no simple and elegant way to exchange rich electronic messages that can be tied to physical world contexts.

The above example points to a need for contextual communications where electronic messages can be attached or affixed to physical, real-world objects. Thus, Applicants' co-pending U.S. patent application Ser. No. 12/078,978 titled, "System And Method For Storing And Retrieving Multimedia Messages On Low-Cost Tags In Order To Facilitate Contextual Communications," filed on Apr. 9, 2008 (the "'978 Application"), which is incorporated by reference herein in its entirety, disclosed systems, method and computer program products for the storing and retrieving of multimedia messages on low-cost tags, such as barcode and RFID tags, thereby facilitating contextual communications where such messages can be attached to physical, real-world objects.

The system disclosed in the '978 Application, with its Universally Unique Identifier—(UUID) based identifier printed on the tags, relies on a communications network to resolve what needs to be done when a tag is scanned by a mobile telephone equipped with appropriate software and sensors for reading and writing messages onto the tags. This implies having a relationship between the end user and the service provider of the contextual messaging software and, a priori, information about the application, UUID-based tag identifiers and configuration of meta data information and relationship between them on the network.

Given the foregoing, what are now needed are systems, methods and computer program products for storage, security, identification, authentication and retrieval of multimedia information using low-cost barcode or RFID tags as virtual storage mediums, whereby a subscription or accounting relationship between a service provider and an end user are not required, nor the provisioning of any information (i.e., meta data) about the tag in the network used for storage of multimedia data.

BRIEF DESCRIPTION OF THE INVENTION

The present invention meets the above-identified needs by providing systems, methods, and computer program products for storing, securing, identifying, authenticating and retrieving multimedia messages using low-cost barcode or RFID tags as virtual storage mediums.

In one aspect of the present invention, two components are provided to allow for storing, securing, identifying, authenticating and retrieving multimedia messages: (1) a low-cost, bar-coded paper tag (such as a label used for printing barcodes) is utilized as a virtual message store, and referred to herein as a "media tag"; and (2) a software application capable of being stored and executed on a mobile telephone, that is used for recording, manipulating and playing information stored virtually on the media tag—referred to herein as a "tag scanner application."

In alternate aspects, the media tags may be constructed from paper, metal, leather, plastic or some other low-cost material. In all aspects, the media tag allows a unique visual identifier to be imprinted (e.g., a Post-It® note encoded with a unique identifier) so that it can be read using a mobile camera or other sensor enabled telephone (e.g., the camera on a Nokia N95 Smartphone).

In another aspect of the present invention, a novel mechanism to record and retrieve information using the low-cost media tags is provided. More specifically, the media tags are designed to provide a unique user experience such that the end user is recording information and retrieving it in a manner as if the media tag is actually an information storage device.

An advantage of aspects of the present invention is that it eliminates the burden of managing user identity, registration, login, password and other traditional network data management processes by uniquely making use of the media tag identification and built-in authentication schemes for managing multimedia information.

Another advantage of aspects of the present invention is that it simplifies the use of the low-cost tags significantly and allows traditional retail business models to be applied for end users to obtain the tags in a store and start using them without signing up for any online account or provisioning information about the tags.

Yet another advantage of aspects of the present invention is that it provides an extremely intuitive user experience to store, retrieve and manage content storage on the tags securely, hiding the complexities of physical storage of the content.

Yet another advantage of aspects of the present invention is that it provides a unique physical tag design so that end users can intuitively understand how to use such tags.

Yet another advantage of aspects of the present invention is that a single scan operation can determine recording or play back action. That is, if a media tag is empty, then scanning it is considered as a "record" operation and, conversely, if the media tag is not empty, then scanning it is considered to be a "play back" operation.

Yet another advantage of aspects of the present invention is that it provides a unique security apparatus for translating physical proximity to the media tag into a form of information access control (i.e., authorization).

Further features and advantages of the present invention, as well as the structure and operation of various aspects of the present invention, are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

FIG. 1 is a block diagram illustrating an exemplary low-cost media tag according to one aspect of the present invention.

FIG. 10-A is a flowchart illustrating a process for moving the content associated with a first media tag to a second media tag according to an aspect of the present invention.

FIG. 10-B is a block diagram illustrating a process for moving the content associated with a first media tag to a second media tag, according to an aspect of the present invention.

FIG. 11-A is a graphical user interface play or record screen displayed by a tag scanner application according to an aspect of the present invention.

FIG. 11-B is a graphical user interface fast play screen displayed by a tag scanner application according to an aspect of the present invention.

FIG. 12 is a block diagram illustrating an exemplary object affixed with a low-cost security tag used in conjunction with a media tag according to one aspect of the present invention.

DETAILED DESCRIPTION

Overview

Figure 2:
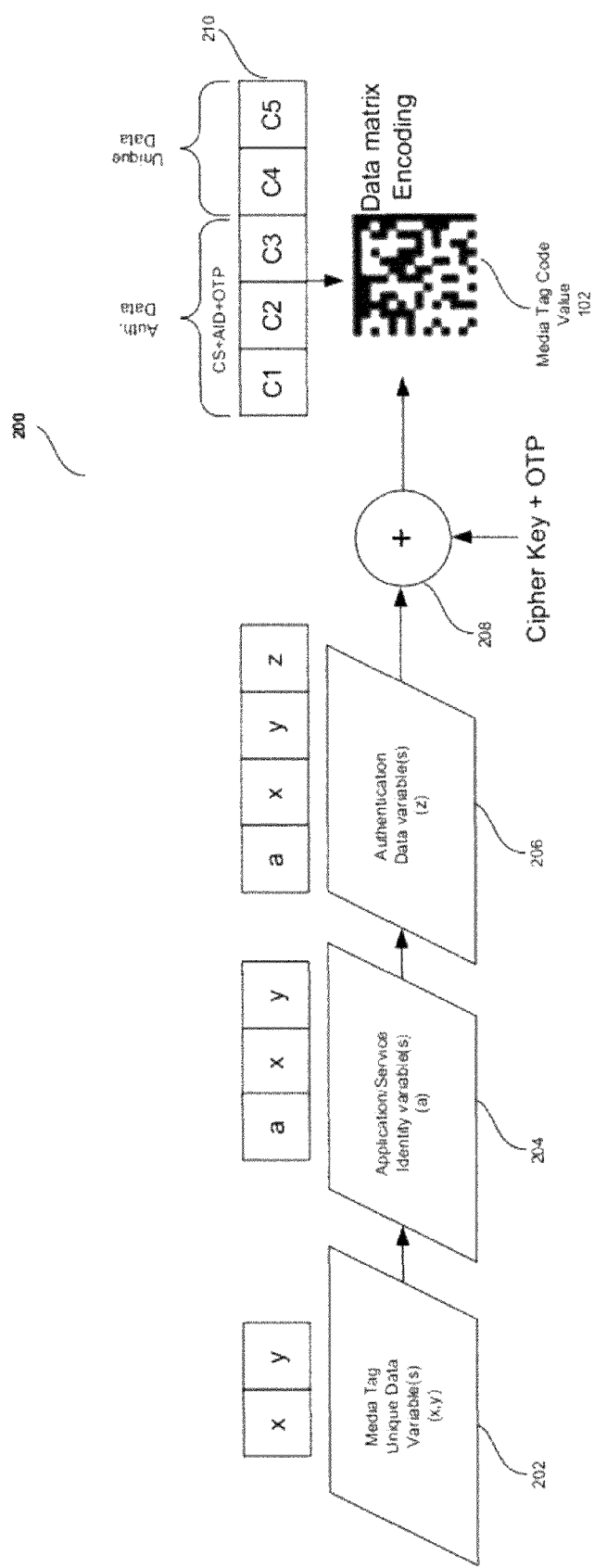
FIG. 2, is a flowchart illustrating a unique visual identifier code creation process according to one aspect of the present invention.

The present invention is directed to systems, methods and computer program products for storing, securing, identifying, authenticating and retrieving multimedia messages using low-cost barcode or RFID tags as virtual storage mediums.

In one aspect of the present invention, a media tag (as described herein) provides a simple and elegant way to record information about what is stored in a closed container (e.g., a cardboard box). That is, cardboard boxes are widely used for storing items in warehouses, offices, stores and even homes. Typically, to find out what is stored in the box, users write on a piece of scrap paper and stick it to the box, or in case of commercial usage, they print out a bill of lading, shipping list or some other paper that is affixed to the box. In such an aspect of the present invention, however, the user can affix a media tag to the box and use a mobile telephone to scan the media tag to facilitate a voice recording describing the contents of the box. At some future time, when the user comes back to search and retrieve contents, they can scan the media tag affixed to the box which facilitates the playback of the recording describing the content of the box. In alternate aspects, a media tag can be associated not only with a voice recording, but with other multimedia such as a picture.

In one aspect of the present invention, end users may obtain media tags through a retail or a wholesale distribution mechanism, such as a pad of Post-It® notes (or any other brand or kind of note paper with attaching means capable of being affixed to common object surfaces while allowing multiple and easy repositioning) which would then serve as the low-cost tag with each sheet of the pad having a pre-printed unique identifier (e.g., barcode, RFID inlay, etc.).

In one aspect of the present invention, end users may obtain the tag scanner application from a service provider either through a CD or a Web download directly onto their mobile telephone. In an alternate aspect, the end user may obtain the tag scanner application on their mobile telephone as part of the pre-loaded applications loaded by the manufacturer, distributor or service provider of the mobile telephone.

In another aspect of the present invention, a user first establishes a context with which the user wants to associate a multimedia file (e.g., record a voice note to be stored in *.wav file or take a picture to be stored in a *jpg file). Depending upon the materials of which the media tag is constructed, this is accomplished by either attaching the media tag to the context (i.e., an object or item associated with the context) or, if physical location is the context, hanging the media tag near a location.

In such an aspect, in order to record the information on the media tag, the user starts the tag scanner application on the mobile telephone which immediately readies the mobile camera to scan the media tag. The user then views the media tag through the camera screen appropriately to capture the visual symbol imprinted on the media tag. The tag scanner application then prompts the user to record a message based on the information on the media tag. In alternate aspects, the media tag may specify one of the multiplicity of multimedia types for recording, such as text, audio, video or picture. In the case of an audio recording, for example, the tag scanner application simply prompts the user to start recording. For picture or video recording, the tag scanner application opens the camera again for the user to take a picture or record a video. For text recording, the tag scanner application opens an editor for the user to input textual information.

In another aspect of the present invention, in order to play back any previously-recorded multimedia information, the user would start the tag scanner application on the mobile telephone which immediately readies the mobile camera to scan the media tag. The user then views the media tag through the camera screen appropriately to capture the visual symbol imprinted on the media tag. The tag scanner application then checks if there is already stored multimedia content associated with the media tag. If there is, the tag scanner application causes the stored information to play or display (as appropriate).

The present invention is now described in more detail herein in terms of the above exemplary contexts. This is for convenience only and is not intended to limit the application of the present invention. In fact, after reading the following description, it will be apparent to those skilled in the relevant art(s) how to implement the following invention in alternative aspects (e.g., using different low-costs tags, affixing the tags to other real-world objects not mentioned herein, the storage/retrieval of other types of multimedia information, the running of the tag scanner application on devices other than a mobile telephone, and the like).

The terms "user," "end user," "customer," and "consumer," and/or the plural form of these terms are used interchangeably throughout herein to refer to those persons and entities who would benefit from the systems, methods and computer program products that the present invention provides for storing, securing, identifying, authenticating and retrieving multimedia messages using low-cost barcode or RFID tags as virtual storage mediums.

Media Tag Design

Referring to FIG. 1, a block diagram illustrating an exemplary low-cost media tag 100 according to one aspect of the present invention is shown. Media tag 100 may be constructed from paper, metal, leather, plastic or any other low-cost, suitable material with attaching means (any "sticky" low-tack adhesive, Velcro® fastener, slot, hole or the like which allows for easy and multiple repositioning) so that it can be affixed to an object. Media tag 100 allows information to be imprinted onto it, including: a unique visual identifier code 102 so that it can be read using a mobile telephone camera or other sensor enabled mobile telephone (e.g., the camera on a Nokia N95 Smartphone); a usage license type 104, a service description 106, a tag type 108 and a brand name 110.

In such an aspect, unique visual identifier code 102 can be any unique identifier, such as a 2D barcode (e.g., Data Matrix, MaxiCode or QR Code), or an RFID inlay for an RFID tag.

Usage license type 104, in such an aspect, can be one of the following as shown in Table 1.

TABLE 1

| Usage License | Description |
| --- | --- |
| Single User | The content can be recorded and played back on the same mobile device. The content is stored locally onto the digital storage medium of the mobile device (i.e., the device's internal memory or an installed media card). |
| Multi-User | The content can be recorded using one mobile device and played using a different mobile device by a different user. The content is stored on a network storage offered by a service provider. |
| Secure Multi-User | Multi-user license with enhanced security which requires a security tag 1202 to be applied along side of media tag 100 by the end user recording the content. Recording and play back requires both tags to be scanned. Recording can be done by one mobile device and play back can be done using a different mobile device by a different user. |

Service description 106, in such an aspect, can be one of the following shown in Table 2.

TABLE 2

| Service | Description |
| --- | --- |
| 1 Minute Audio | Record one minute of audio content |
| Single Picture | Record single picture to the tag |
| Multiple Pictures | Record multiple pictures to the tag |
| 30 Second Video | Record 30 seconds of video content |
| 140 Char Text | Record (enter) 140 characters of text |
| 48-bit Security | This denotes a 48-bit security code applied to media tag 100. When this tag is scanned the tag scanner application software asks the user to also scan the media tag if not already scanned. |

As will be appreciated by one skilled in the relevant art(s) after reading the description herein, the end user simply needs to scan media tag 100, and tag 100 has built-in application identifiers corresponding to the specific service description 106 printed on the tag itself. Thus, tag scanner application software will automatically start the appropriate service facilitating the user to record the appropriate multimedia content. Because media tag 100 functions as a virtual storage medium, service description 106 enables an end user to discern what the tag is and how it can be used.

In such an aspect, tag type 108 identifies tag 100 as either a "media" tag or a "security" tag (as described below), and brand name 110 would simply be the service provider's trademark/brand to identify the source of the tag 100 purchased by the end user.

In an aspect of the present invention, there are four design considerations to the design of media tags 100. These are: identity, authentication, user experience, and physical access. First, media tags 100 employ a unique identifier so that the content stored on a digital storage medium is unambiguously tied to the media tags' identifier. Second, media tags 100 must be authenticated to avoid confusion and unauthorized data access if users or third parties are allowed to print similar visual codes as those of the service provider for the purpose of hacking. Third, in order to simplify the user experience, media tags 100 must indicate to the tag scanner application on the mobile telephone what the media tag is for and what feature needs to be invoked when scanned. Fourth, there needs to be sufficient security so that the information is not accessed by unauthorized persons and information is recorded and accessed back only when someone has physical access to the media tag 100.

Referring to FIG. 2, a flowchart illustrating a unique visual identifier code creation process 200, according to one aspect of the present invention, is shown. That is, in such an aspect, a unique visual identifier code 102 (e.g., an encoded Data Matrix 2D barcode) is created using process 200 for imprinting onto a media tag 100.

In such an aspect, process 200 comprises utilizing a set of unique data variables, an application identity variable and a set of authentication data variables. In a step 202, x and y as unique data variables are specified, and determine the uniqueness of the overall information code 102 generated. In a step 204, a variable a is added as an application identity variable (AID) to identify the service to be invoked when the tag 100 is eventually utilized (i.e., indicating a service description 106). In a step 206, an authentication variable z is generated using, for example, a checksum (CS) method. In a step 208, a ciphered information code is generated using a cipher, including a randomly-generated one time pad (OTP). In a step 210, a visual construction of the ciphered information code is generated using a data matrix 2D encoding process. This results in the media tag value 102 and thus process 200 terminates.

As will be appreciated by a person skilled in the relevant art(s), the following elaboration of process 200 is simply an example and the actual implementation may vary in terms of number of variables used for each of the steps of process 200.

In such an aspect, process 200 ensures the uniqueness of identifier code 102 by data variables x and y which are a set of counters with values in the range of, in one aspect, 0 to 255. In such an aspect, the 0-255 value range allows the value to be represented by an 8-bit ASCII character based variable. A string S, representing the unique value using x and y can thus be represented as:

$$S = chr(x)(+)chr(y)$$

where (+) is a simple concatenation of ASCII characters represented by variables x and y, and the chr( ) function converts the specified ASCII character hexadecimal code to a character. For example, with x=$61_H$ and y=$62_H$, the string S with the concatenation of ASCII character values of x and y becomes S="ab".

Figure 3:
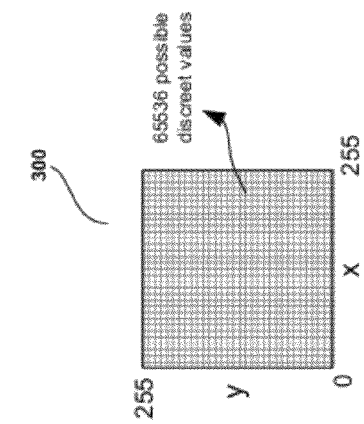
FIG. 3 is a diagram illustrating a data variable space of ASCII character values used in creating an identifier code for a low-cost media tag according to one aspect of the present invention.

Referring to FIG. 3, a diagram illustrating a data variable space 300 of ASCII character values of x and y used in creating identifier code 102, according to one aspect of the present invention, is shown. To visualize S in data space 300, S can be considered as a polynomial function governed by the values of variables x, y where x and y are each less than or equal to 255. Thus, data variable space 300 is the plot of a polynomial function equivalent of string S considering all valid points represented by data variables (x,y).

Data variable space 300 illustrates that if identifier code 102 is generated with two variable counter values—x and y—there are a total of 65,536 distinct and valid possible values. If these two variables solely formed part of media tag identifier 102, then it would be easy for an unauthorized party to randomly generate and print media tags 102 as every value of x and y randomly generated would be valid. Thus, in an aspect of the present invention, a third data variable z representing a checksum is also employed using the following formula:

$$z = (x+y) \bmod 255$$

Figure 4:
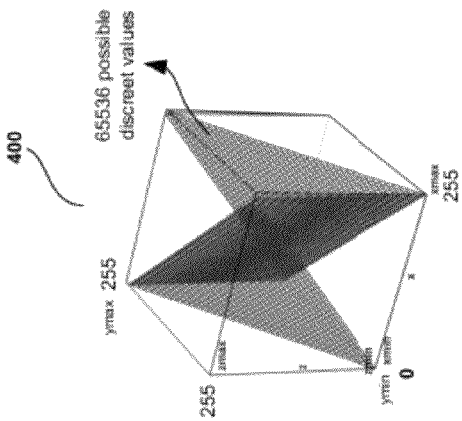
FIG. 4 is a diagram illustrating a data variable space of ASCII character values used in creating an identifier code for a low-cost media tag according to one aspect of the present invention.

Referring to FIG. 4, a diagram illustrating a data variable space 400 of ASCII character values of x, y and z used in creating identifier code 102, according to one aspect of the present invention, is shown. That is, grid 400 shows the valid set of values of string S formed as a polynomial function with the help of three variables—x, y and z. Because the total range of values represented by 8-bit variables x, y and z is 16,777,216 (i.e., $256^3$) and the valid set of values forming grid 400 are only 65536, it is possible to the authenticate identifier code 102 value of media tag 100 by checking the value of z in the string S, represented by variables x, y and z. Any value of media tag that doesn't conform to the relationship between x, y, and z variables are invalid.

In such an aspect, as will be appreciated by one skilled in the relevant art(s), 65536 identifier code 102 values are valid out of a total possible range of over 16 million. While this authentication certainly helps ascertain a valid media tag 100, the security aspect of media tag 100 is not completely satisfied. This is because unauthorized persons may still attempt a hack by understanding the relationship between variables x, y and z as detailed above because the relationships are easily visible from their imprint on media tags 100. That is, those skilled in the relevant security arts and algorithmic design may determine how to generate new media tags 102 by examining a few previously-printed media tags 100 as the underlying information structure is visible to the trained eye or with the help of computers.

Given the above, from a security point of view, it is necessary to encrypt the underlying data structure to randomize the variable space. In one aspect, this is achieved by selecting a suitable cryptographic method which keeps the length of string S small while hiding the underlying variable values and any relationship between them. This assures that the underlying encoding of a barcode or RFID tag structure is efficient from a cost and size point of view as there are fewer values to be encoded. Thus, in alternate aspects, a cipher technique that preserves the size of the encrypted information as close to original information element length as possible is employed (e.g., XOR cipher, One Time Pad, Vernam cipher, Vigenère cipher or the like).

Figure 5:
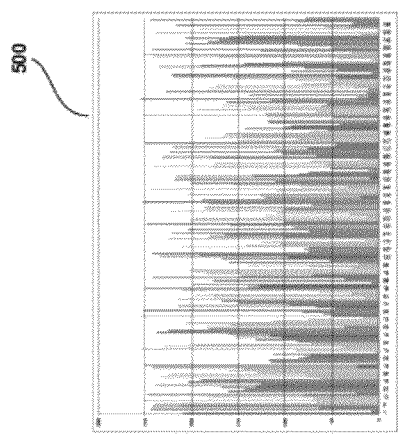
FIG. 5 is a graph illustrating an example of variable randomization with the use of a cipher mechanism during the creation of an identifier code for a low-cost media tag, according to an aspect of the present invention.

Referring to FIG. 5, a graph 500 illustrating an example of randomization of variables with the use of an XOR cipher mechanism during the creation of an identifier code 102, according to an aspect of the present invention, is shown. That is, graph 500 plots the value of variable z after employing the cipher mechanism. As will be appreciated by those skilled in the relevant art(s), the contrast between grid 400 and graph 500—the former showing a "well behaved" value of z as it is computed as a simple checksum, the later showing random values of z due to ciphering. (For clarity, graph 500 is shown as a two-dimensional representation of variable z values, whereas grid 400 is a 3-dimensional depiction.)

In an aspect of the present invention, the final value of identifier code 102 imprinted on media tag 100 is thus generated by a combination of unique data identifier, application identifier and authentication variables whose values are encrypted using a length-preserving cipher algorithm. This is shown in FIG. 2 (process 200), where ciphered authentication variables C1, C2 and C3 represent a checksum (CS), application identifier (AID) and One Time Pad (OTP) cipher technique.

As will be appreciated by one skilled in the relevant art(s) after reading the description herein, process 200 embeds media tag 100 authentication within the value of identifier code 102 itself, and thus alleviates the need to implement a network-based authentication system and the associated over head typically seen in online content access in traditional Web-based systems. This is because, in process 200, there is no need to identify and authenticate a user, as such function is now shifted to media tag 100 authentication. The media tag-based authentication is similar to authentication using certificates (where certificates are stored in the end user machine), except that the "certificate" here is just a unique value embedded within the cipher-encoded space 102 of each media tag 100.

Tag-based authentication process 200 facilitates physical access-based security where if someone can read and scan media tag 100, they can get to the information. With such a model there is no need to identify or authenticate the user's identity. This feature is critical for multi-user implementation of media tag 100 where the information written by one user may be consumed by another user as long as they can access media tags 100. In such an aspect, users and their identities are not known and not necessary.

Media Tag Operations

In an aspect of the present invention, a tag scanner application capable of being stored and executed on a mobile telephone, that is used for recording, manipulating and playing information stored virtually on media tags 100 is provided. In such an aspect, the tag scanner application provides a set of operations done for managing content using media tags 100, including record, play, fast play, clear and move operations.

Figure 6:
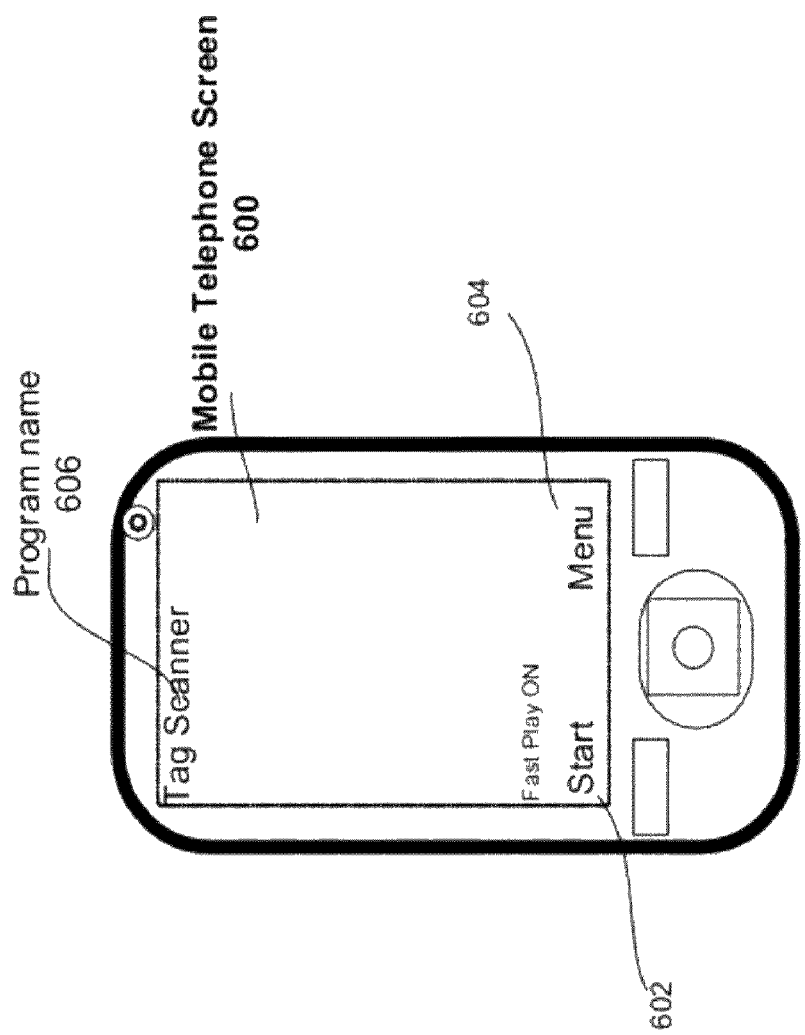
FIG. 6 is a graphical user interface home screen displayed by a tag scanner application according to an aspect of the present invention.

Referring to FIG. 6, a graphical user interface home screen 600 displayed by the tag scanner application executing on a mobile telephone according to an aspect of the present invention is shown. Home screen 600 has a Start button 602, a Menu button 604 and a program name label 606. In such an aspect, when Start button 602 is pressed, the tag scanner application switches on the camera built-in or connected to the mobile telephone to start scanning a media tag 100 for the purpose of playing or recording the content. The tag scanner application makes an automatic determination to record or play content based on whether the Tag is "empty" or if there is a prior recording of content, respectively. As will be appreciated by one skilled in the relevant art(s) after reading the description herein, this automatic determination reduces the number of key strokes needed and improves user experience.

Figure 7:
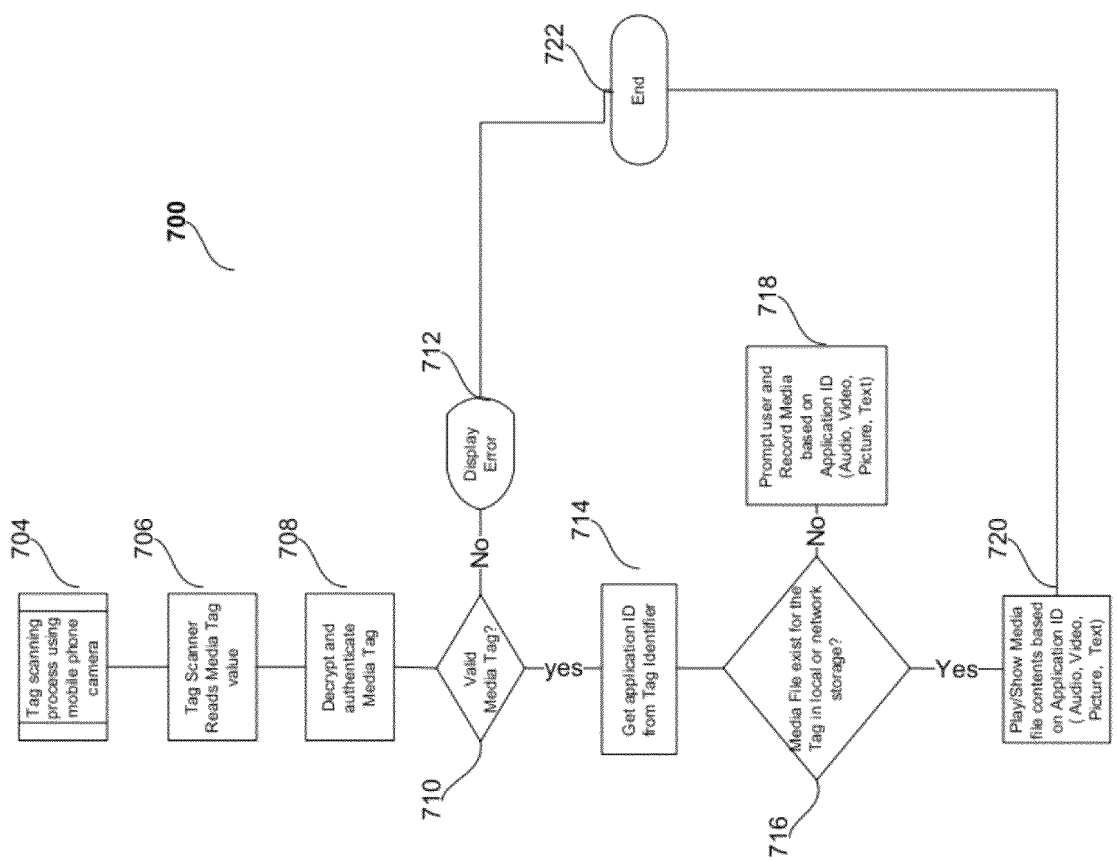
FIG. 7 is a flowchart illustrating a process for recording or playing of content associated with a media tag according to an aspect of the present invention.

Referring to FIG. 7, a flowchart illustrating a process 700 for recording or playing of content associated with a media tag 100, according to an aspect of the present invention, is shown. Process 700 begins at step 704 and proceeds immediately to step 706 where media tag 100 is scanned. In step 708, media tag 100 is decrypted using a pre-determined secret key to ascertain the identity and authentication variable values from the unique code 102 imprinted onto tag 100.

In step 710, process 700 determines if the unique code 102 read in step 708 is valid. If not, an error is displayed to the users mobile telephone in step 712 and process 700 terminates as indicated by step 722. Otherwise, process 700 proceeds to step 714.

In step 714, process 700 utilizes the application identifier (which is one of the authentication variables obtained from step 708) to determine the operation needed to be performed after the scan. The operation to be performed, in an aspect, includes: record or play voice; record or play video; record or show picture; or enter or show text. Further, the application identifier also denotes if media tag 100 is used for single user or multiple users.

In step 716, process 700 determines if there is already content stored that is associated with the specific media tag 100 just read in step 706. Such content may be located in the local store (i.e., the memory of the mobile phone) for single user operation or network store for multi-user operation (similar to the disclosure in the '978 Application).

If there is already content associated with media tag 100 (and stored in the local or network storage) then process 700 proceeds to step 720. In step 720, the content is played. If there is no content recorded a priori, then process 700 proceeds to step 718 where the user is prompted to record content appropriately based on the type of the content denoted by the application identifier. Process 700 then ends as indicated by step 722.

As will be appreciated by one skilled in the relevant art(s) after reading the description herein, the unique identifier code 102 allows tag 100 to serve as a virtual multimedia storage medium. That is, the scanning/reading of tag 100 allows the tag scanner application to use code 102 to serve as an index into the local mobile telephone memory or network store to quickly retrieve multimedia files in a quicker, more secure and more convenient manner than conventional file storing and retrieval methods.

Figure 8:
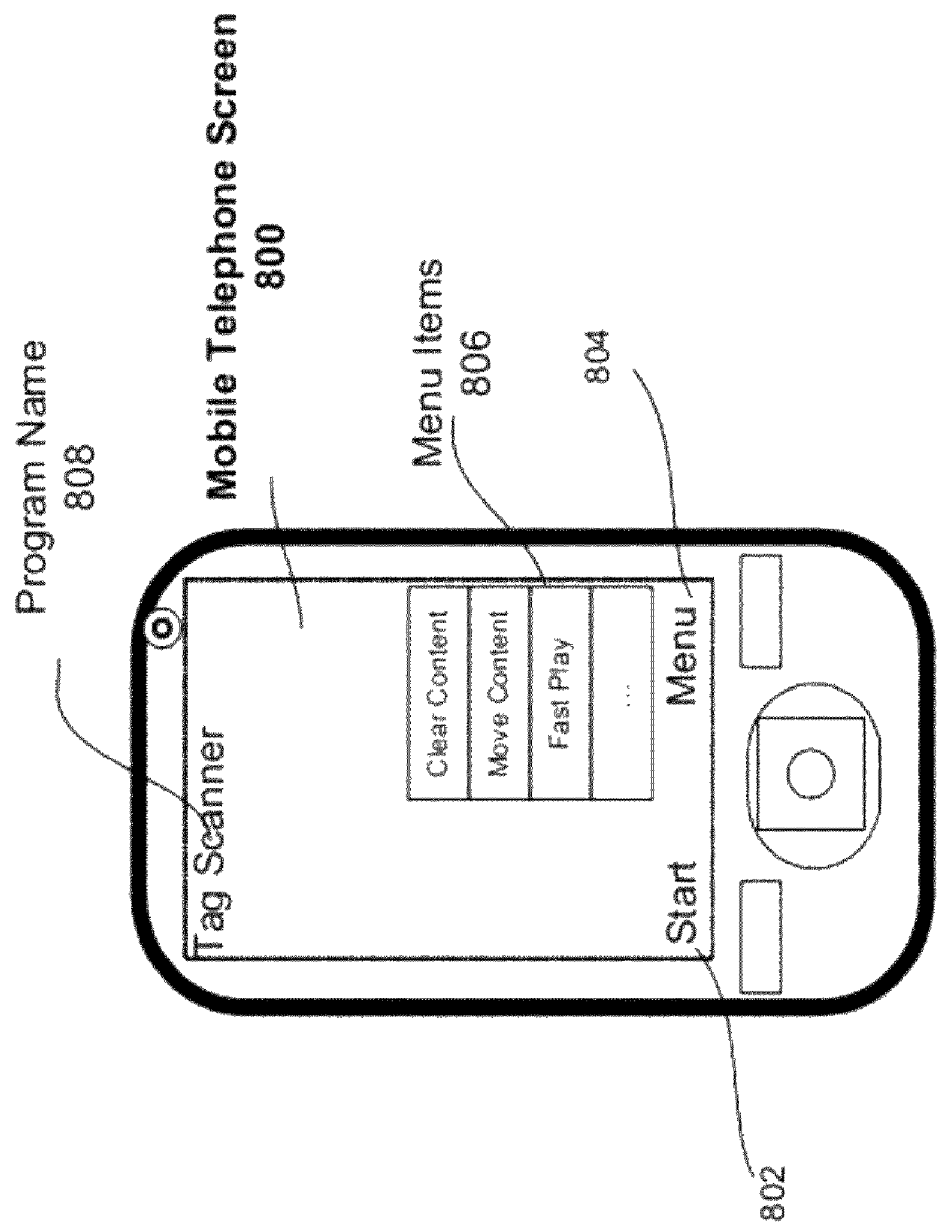
FIG. 8 is a graphical user interface menu screen displayed by a tag scanner application according to an aspect of the present invention.

Referring to FIG. 8, a graphical user interface menu screen 800 displayed by the tag scanner application executing on a mobile telephone according to an aspect of the present invention is shown. Menu screen 800 has a Start button 802, a Menu button 804, a menu panel 806 and a program name label 808. Menu panel 806 lists Clear Content, Move Content and Fast Play as exemplary operations which may be performed on media tag 100. In such an aspect, as an example of a menu operation, when Menu button 804 is pressed the user can select the "Clear Content" option from menu panel 806. Upon this selection, the tag scanner application switches on the camera to start scanning a media tag 100. After the scan, the user may clear tag 100 by re-recording content associated with the tag. This may be done for many reasons. For example, if tag 100 is printed on a metal tag affixed to a certain piece of equipment, the recording associated with the tag can be changed by clearing the content and re-recording new content. This avoids the need for a new tag to be affixed to the equipment every time new data associated with the equipment becomes available (which can be expensive).

Figure 9:
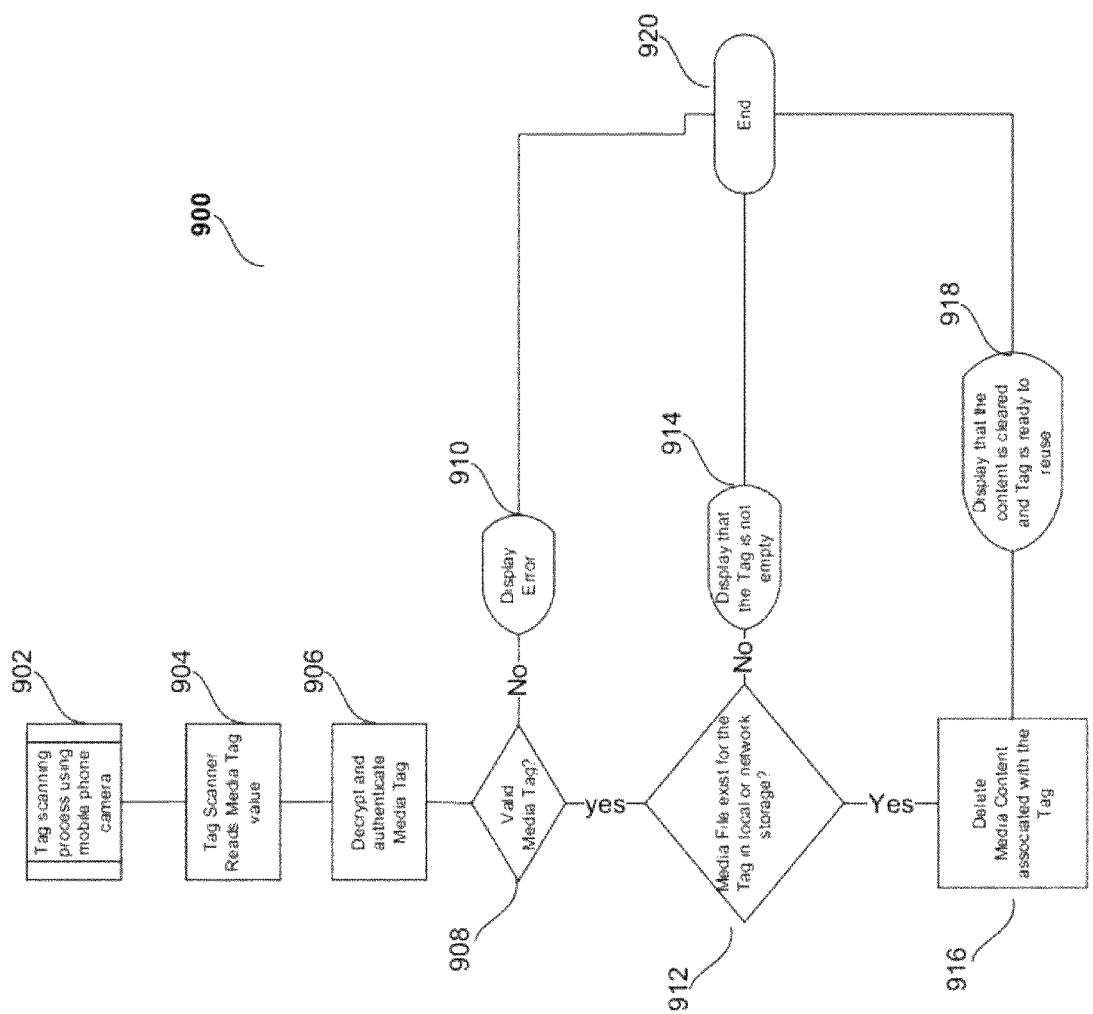
FIG. 9 is a flowchart illustrating a process for clearing the content associated with a media tag according to an aspect of the present invention.

Referring to FIG. 9, a flowchart illustrating a process 900 for clearing the content associated with a media tag, according to an aspect of the present invention, is shown. Process 900 begins at step 902 and proceeds immediately to step 904 where media tag 100 is scanned. In step 906, media tag 100 is decrypted using a pre-determined secret key to ascertain the identity and authentication variable values from the unique code 102 imprinted onto tag 100.

In step 908, process 900 determines if the unique code 102 read in step 906 is valid. If not, an error is displayed to the user's mobile telephone in step 910 and process 900 terminates as indicated by step 920. Otherwise, process 900 proceeds to step 912.

In step 912, process 900 determines if there is already content stored that is associated with the specific media tag 100 just read in step 904. Such content may be located in the local store (i.e., the memory of the mobile phone) for single user operation or network store for multi-user operation (similar to the disclosure in the '978 Application). If there is no content associated with tag 100, an error is displayed to the users mobile telephone in step 914 and process 900 terminates as indicated by step 920.

If there is already content associated with media tag 100 (and stored in the local or network storage) then process 900 proceeds to step 916. In step 916, the content associated with tag 100 is deleted. Process 900 then ends as indicated by step 920.

Referring to FIG. 10-A, a flowchart illustrating a process 1000 for moving the content associated with a first media tag to a second media tag, according to an aspect of the present invention, is shown. Process 1000 is initiated by selecting the Move Content menu item from menu panel 806. Process 1000 begins at step 1002 and proceeds immediately to step 1004 where a first media tag 100 is scanned. In step 1006, first media tag 100 is decrypted using a pre-determined secret key to ascertain the identity and authentication variable values from the unique code 102 imprinted onto tag 100.

In step 1008, process 1000 determines if the unique code 102 read in step 1004 is valid. If not, an error is displayed to the users mobile telephone in step 1010 and process 1000 terminates as indicated by step 1034. Otherwise, process 1000 proceeds to step 1012.

In step 1012, process 1000 determines if there is already content stored that is associated with the specific first media tag 100 just read in step 1004. Such content may be located in the local store (i.e., the memory of the mobile phone) for single user operation or network store for multi-user operation (in a similar fashion to the disclosure in the '978 Application). If there is no content associated with tag 100, an error is displayed to the users mobile telephone in step 1014 and process 1000 terminates as indicated by step 1034.

If there is already content associated with first media tag 100 (and stored in the local or network storage) then process 1000 proceeds to step 1016. In step 1016, process of processing a second media tag 100 begins, and in step 1018, the second media tag 100 is scanned.

In step 1020, second media tag 100 is decrypted using a pre-determined secret key to ascertain the identity and authentication variable values from the unique code 102 imprinted onto tag 100.

In step 1022, process 1000 determines if the unique code 102 read in step 1006 is valid. If not, an error is displayed to the users mobile telephone in step 1024 and process 1000 terminates as indicated by step 1034. Otherwise, process 1000 proceeds to step 1026.

In step 1026, process 1000 determines if there is already content stored that is associated with the specific second media tag 100 just read in step 1018. Such content may be located in the local store (i.e., the memory of the mobile phone) for single user operation or network store for multi-user operation (in a similar fashion to the disclosure in the '978 Application). If there is content associated with tag 100 (and stored in the local or network storage), an error is displayed to the users mobile telephone in step 1028 and process 1000 terminates as indicated by step 1034.

If there is no content associated with second media tag 100, then process 1000 proceeds to step 1030. In step 1030, the content associated with the first tag 100 is then made to be associated with the second media tag 100 and disassociated (i.e., "deleted") from the first media tag 100 in one atomic operation. The results of this operation are then displayed to the user on mobile screen 800 in step 1032. Process 1000 then ends as indicated by step 1034.

As will be appreciated by one skilled in the relevant art(s) after reading the description herein, moving the content associated with a first media tag to a second media tag may be necessary in circumstances where the low-cost media tag may get scratched, smudged, torn or simply wears out. While the media tag is still in readable (but beginning to become worn) condition, the user may want to preserve the content. Instead of rerecording the information onto a new media tag, the content may be moved from one media tag to another media tag as per process 1000. Referring to FIG. 10-B, a block diagram illustrating process 1000 according to an aspect of the present invention is shown. More specifically, it illustrates how content is tagged before and after the content move operation according to an aspect of the present invention.

Referring to FIG. 11-A, a graphical user interface play/record screen 1100 displayed by the tag scanner application executing on a mobile telephone according to an aspect of the present invention is shown. Play/record screen 1100, provided to allow for playing or recording tags 100, has a Stop button 1102, a program name label 1104, a camera view finder window 1106, a tag display 1108, and a screen prompt 1110. In such an aspect, screen 1100 allows a user to record information to be associated with a media tag 100 after the camera has scanned the media tag 100, or play any associated content.

Referring to FIG. 11-B, a graphical user interface fast play screen 1150 displayed by the tag scanner application executing on a mobile telephone according to an aspect of the present invention is shown. Fast play screen 1150, provided to allow for playing multiple tags 100, has a Stop button 1102, a program name label 1104, a camera view finder window 1106, a time display 1108, and a screen prompt 1110. In such an aspect, screen 1150 allows a user to read a media tag 100 and play any associated content while the camera is simultaneously on in order to scan additional media tags 100. That is, while the content associated with a first media tag 100 is still playing, the user may scan another media tag and play the new content—thus pre-empting the previously-playing content. This allows rapid scanning and playing in certain situations without waiting for previous audio or video recording to complete playing. This improves user experience by reducing the number of key strokes needed to play multiple tags.

Multi-User Tags

As will be appreciated by one skilled in the relevant art(s) after reading the above description, aspects of the present invention allow a single user to store, secure, and retrieve multimedia messages using low-cost barcode or RFID tags 100 as virtual storage mediums. In such aspects, the same user who stored the multimedia content may retrieve it using the same mobile telephone. In alternate aspects, however, media tags 100 used to store information recorded by one user may be used by another user to read the same information. In this case the content stored by the first user (who recorded information on a media tag) is stored in a network instead of the local storage in the mobile device (in a similar fashion to the disclosure in the '978 Application).

In order to record information on a multi-user version of media tag 100, user A starts the tag scanner application on the mobile telephone and follows process 700 described above. In this instance, however, the recorded information is not stored locally onto the mobile telephone, but transmitted to a network in communications with the mobile telephone for storage tagged by the media tag value 102 (in a similar fashion to the disclosure in the '978 Application).

When user B wants to retrieve the message, they start the tag scanner application on the mobile phone and scan the media tag value 102. The tag scanner software then contacts a network server to access and play the message (in a similar fashion to the disclosure in the '978 Application). In one aspect, in order to optimize the user experience, the network server streams the information for audio and video media formats so that the user can start hearing/seeing the information immediately.

In a typical Web-based data access mechanism, users are typically identified and they are granted data access privileges for privacy and security, especially in a multi-user environment. In aspects of the present invention, however, there is no need to identify the users, nor grant them privileges. This is accomplished by shifting the burden of identity and authentication to the media tag 100 itself.

In another aspect of the present invention, the data access control privileges are achieved using physical proximity to the tag equipment. That is, the physical proximity-based data access stipulates that if someone can get access to media tag 100 physically and if they are equipped with the appropriate tag scanner application, then they may obtain access to the data. Conversely, it is difficult to have someone access the information by guessing the media tag value 102 and printing (counterfeit) tags themselves to access the data remotely without authorization.

Figure 15:
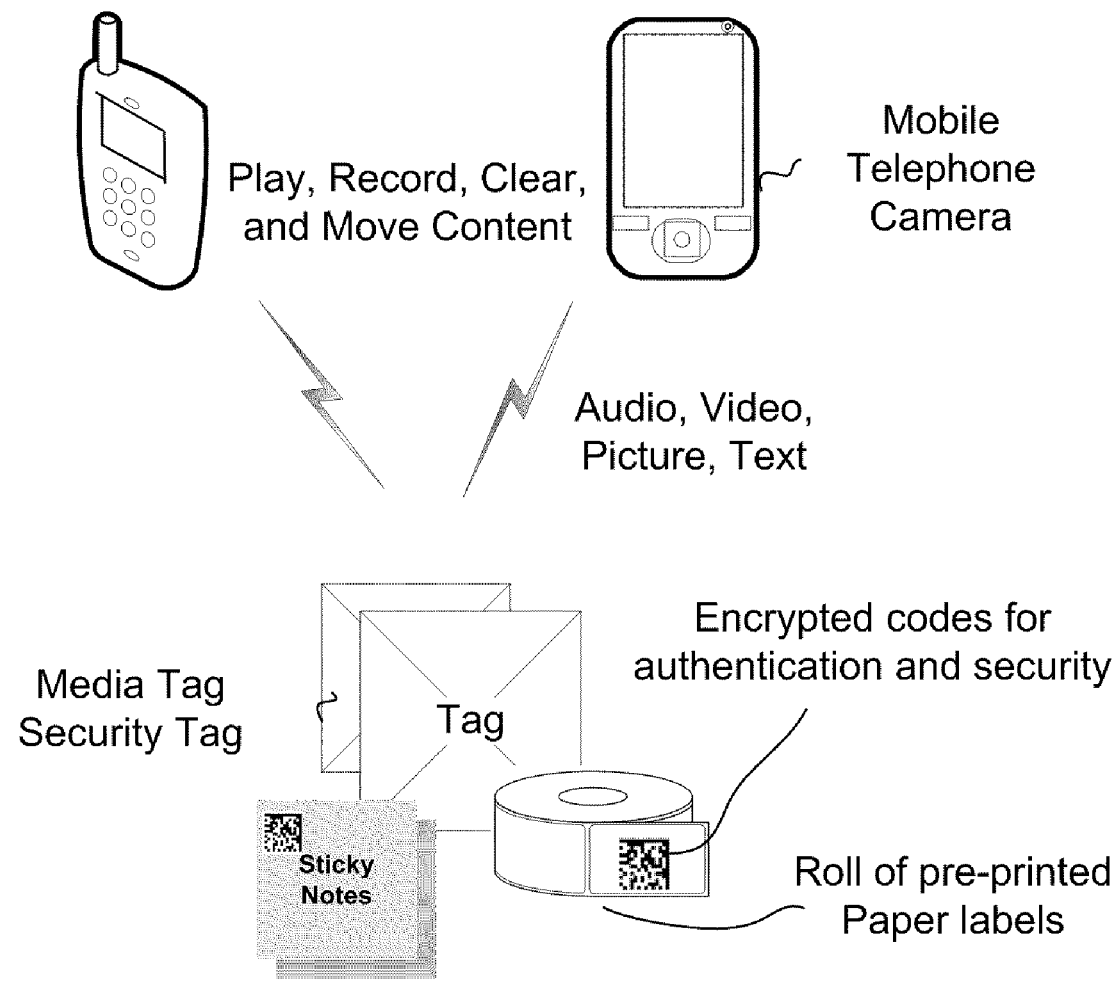
FIG. 15 is a block diagram illustrating an exemplary system for storing, securing, identifying, authenticating and retrieving of multimedia information using low-cost barcode or RFID tags according to one aspect of the present invention.

The above-described embedded authentication and consequent physical proximity to equipment based data access allows for a new business model where the media tags 100 can be sold in large quantities (e.g., multiple tags printed on one standard 8.5"×11" sheet of paper or in a roll similar to U.S. postage stamps) through retail chains without knowing who the end user is and without requiring such end users to establish an account with an online service provider to secure their data. (See FIG. 15.) Thus the identity aspect of the media tag 100 design described above is necessary so that each tag is unique. This is accomplished by defining a valid data space for the media tag values which is defined by a set of counters operated centrally by the manufacturer of the media tags. This mechanism ensures that there is no duplication of officially manufactured tags (i.e., to combat counterfeiting). However, to reduce the occurrence of unauthorized production with associated duplication and security issues, there needs to be a mechanism to ensure the originality of the media tag values. This is accomplished by authentication.

Authentication (i.e., the process of ascertaining the identity) of the media tags is accomplished by adding additional data to the identity that encodes some kind of unique relationship among the data variables so that the media tag can be validated (authenticated) by examining this unique relationship. Implicit is the assumption that a randomly generated data do not contain this relationship to any significant probability. However, if the data and relationship is published as media tag value as is, it is akin to publicly announcing the password in the case of accessing a Web site. Therefore the identity data and authentication data needs to be obfuscated to hide the relationship. The obfuscation is accomplished by a cipher key which, when applied to the media tag value, randomizes its data space. The randomized values are used to encode the media tag.

Security Tag Design

The above-described aspects of the media tag 100 design gives rise to a media tag with unique identity, built-in authentication and encryption of the media tag value. In some situations, however, users may desire a higher level of security. In one aspect of the present invention, this is accomplished by appending a long security key to the media tag by way of a different, second tag referred to herein as a "security tag" to an object.

Referring to FIG. 12, a block diagram illustrating an exemplary object 1200 affixed with a low-cost security tag 1202 and used in conjunction with a media tag 100, according to one aspect of the present invention, is shown.

In one aspect, security tag 1202 is similar in design to media tag 100, and is applied alongside of the media tag to tag the content as shown in FIG. 12. When a user desires to record information on media tag 100 in a more secure fashion than process 700 described above, the user scans—in one or more scan attempts—both media tag 100 as well as security tag 1202 that has a unique embedded security key. Once the tag scanner application recognizes both tags, it associates the tags if there is no content already stored on media tag 100 and prompts user to record the content. If there is already content stored on media tag 100, the tag scanner application verifies that the security code is matched before playing the content.

Multi User Enhanced Security

In the multi-user aspects of media tag 100 described above, one user may record information and allow another user equipped with the tag scanner application to read the information. In such aspects, although media tag 100 incorporates the security features described above to prevent an unauthorized third party (e.g., a hacker) to randomly guess the valid media tag value 102 and obtain the information, this security may not be sufficient for certain applications. The security risk is similar to the online password mechanisms employed by millions of Web sites around the world where an unauthorized person can "guess" the password and hack into the data. The security mechanism employed in the current model of Web site-based data access is to use longer passwords with special characters (e.g., a mix of lower and upper case letters, use of numbers, etc.). Essentially, this process of applying longer passwords is to reduce the possibility of guessing the correct password by increasing the size of the underlying data space of the password domain.

Therefore, in an aspect of the present invention, security tag 1202, identically designed to media tag 100 with the exception of an application identifier which indicates that it is used solely for security purposes and works along side of a "regular" media tag 100, is employed. In such an aspect, when the tag scanner application reads such an application identifier, it associates security tag 1202 to media tag 100 before accepting or serving the information.

In an aspect of the present invention, security tag 1202 comprises four ASCII characters having 8 bits each. Thus, the total data space covering these four characters is 4,294,967,296 (i.e., $256^4$). If media tag 102 has just one authentication variable, there is simply a one in 256 chance of randomly (but correctly) guessing media tag value 102. By associating security tag 1202 with media tag 102, and tying the content appropriately, the chance of correctly guessing the entire value by a random hacking method is now one in a trillion (or more precisely, $256^5=1,099,511,627,776$).

Figure 13:
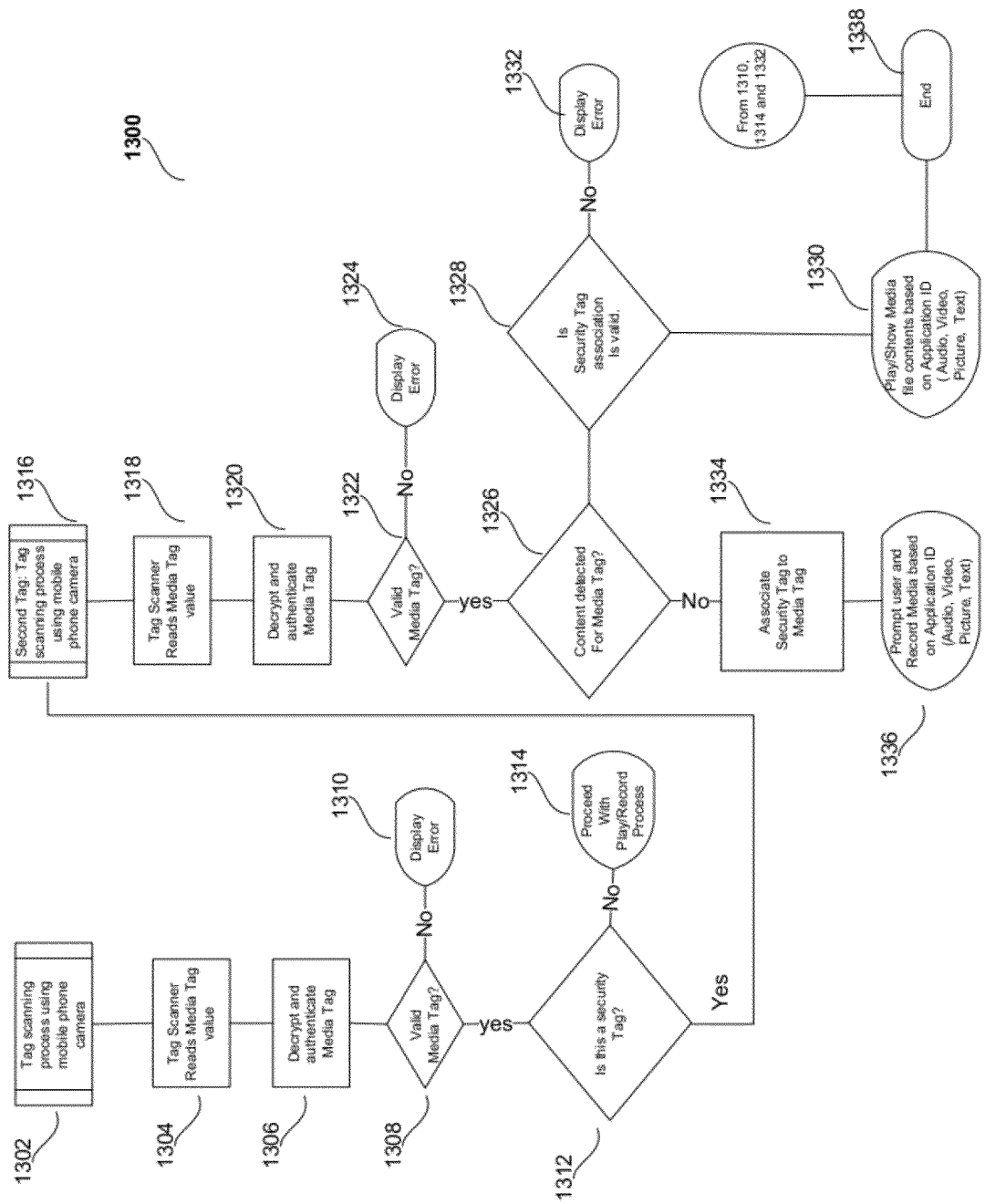
FIG. 13 is a flowchart illustrating a process for storing or retrieving content associated with a security tag according to an aspect of the present invention.

Referring to FIG. 13, a flowchart illustrating a process 1300 for storing or retrieving content associated with a security tag 1202, according to an aspect of the present invention, is shown. Process 1300 begins at step 1302 and proceeds immediately to step 1304 where a tag (media tag 100 or security tag 1202) is scanned. In step 1306, the tag is decrypted using a pre-determined secret key to ascertain the identity and authentication variable values from the unique code 102 imprinted onto tag 100.

In step 1308, process 1300 determines if the unique code 102 read in step 1306 is valid. If not, an error is displayed to the users mobile telephone in step 1310 and process 1300 terminates as indicated by step 1338. Otherwise, process 1300 proceeds to step 1312.

In step 1312, process 1300 determines if the application identifier read in step 1306 is one of a security tag 1202 or a media tag 100. If the tag is a media tag 100, in step 1314, the user is allowed to proceed with normal playback or record functionality as described above, and process 1300 terminates as indicated by step 1338. Otherwise, process 1300 proceeds to step 1316.

In step 1316, processing a second tag (media tag 100 or security tag 1202) begins, and in step 1318, the second tag is scanned. In step 1320, the second tag is decrypted using a pre-determined secret key to ascertain the identity and authentication variable values from the unique code 102 imprinted onto the tag.

In step 1322, process 1300 determines if the application identifier read in step 1318 is one of a media tag 100. If not, an error is displayed to the users mobile telephone in step 1324 and process 1300 terminates as indicated by step 1338. Otherwise, process 1300 proceeds to step 1326.

In step 1326, process 1300 determines if there is already content stored that is associated with the specific second media tag 100 just read in step 1318. Such content may be located in the local store (i.e., the memory of the mobile phone) for single user operation or network store for multi-user operation (in a similar fashion to the disclosure in the '978 Application). If there is content associated with tag 100 (and stored in the local or network storage), process 1300 proceeds to step 1328, otherwise to step 1334.

In step 1328, process 1300 determines if the security code returned by security tag 1202 matches the security code associated with the stored content. If not, then an error is displayed to the users mobile telephone in step 1332 and process 1300 terminates as indicated by step 1338. If there is a match, process 1300 proceeds to step 1330 where the application identifier is utilized to determine the operation needed to be performed (e.g., play voice; play video; show picture; or show text). Process 1300 then terminates as indicated by step 1338.

In step 1334 (if there is no content associated with media tag 100 as determined in step 1326), security tag 1202 is associated with media tag 100. Then, in step 1336, the user is prompted to record content appropriately based on the type of the content denoted by the application identifier of the media tag 100. Process 1300 then terminates as indicated by step 1338.

In alternate aspects of the present invention, as will appreciated by one skilled in the relevant art(s) after reading the description herein, process 1300 may vary depending upon whether the first tag read is a security tag 1202 or a security-enabled media tag 100. In yet alternate aspects of the present invention, process 1300 may vary if both tags are read in one single scan operation. In sum, process 1300 aims to read media tag 100 and security tag 1202 in tandem in a single step or multiple steps, and the appropriate play or record operation is initiated once the association is established or checked.

As will be appreciated by one skilled in the relevant art(s) after reading the description herein, the design of security tag 1202 results in a unique and secure business process because the security tags can be received by the end user independent of how they obtained the media tags. Thus, the application of security tags to the content at the time of end use of the media tags removes any possibility of unauthorized access to the tags (and their valid values) during supply chain transit.

As will also be appreciated by one skilled in the relevant art(s) after reading the description herein, a key benefit of multi-user version of tags and the method of recording and contextually transmitting information is that it eliminates expensive system designs involving B2B information transmission which require maintaining user credentials and access control mechanisms found in traditional Electronic Data Interchange (EDI) systems. Thus, in aspects, the present invention facilitates a much cheaper and innovative alternative for certain kinds of applications where information can be transmitted to different user organizations using low cost tags, in a contextual way, without a need for user identities and digital access control techniques.

Environment

The present invention (i.e., tag scanner application, processes 200, 700, 900 or 1000 or any part(s) or function(s) thereof) may be implemented using hardware, software or a combination thereof and may be implemented in one or more computer systems or other processing systems. However, the manipulations performed by the present invention were often referred to in terms which are commonly associated with mental operations performed by a human operator, such as adding or comparing. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 14:
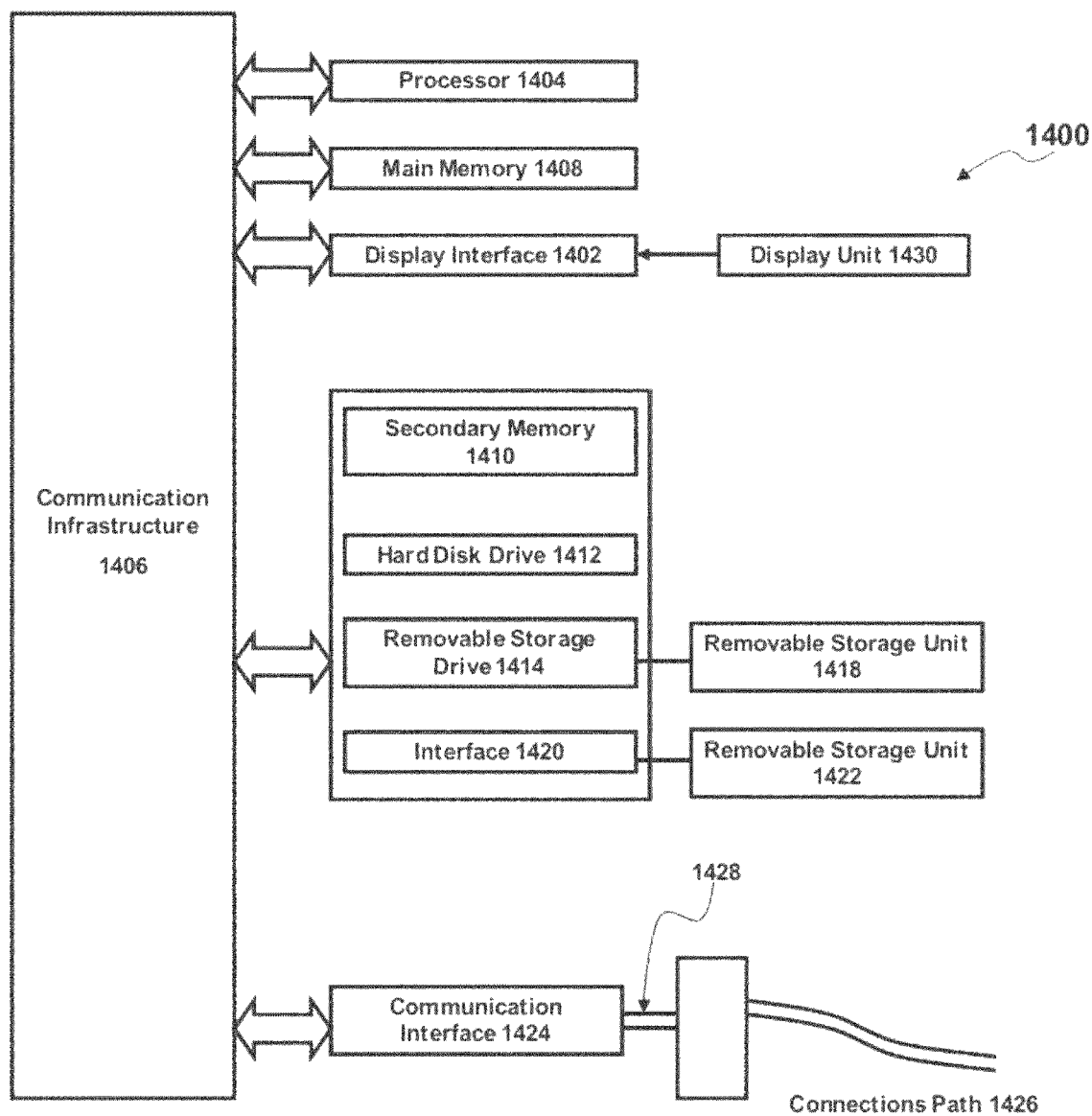
FIG. 14 is a block diagram of an exemplary computer system useful for implementing the present invention.

In fact, in one aspect, the invention is directed toward one or more computer systems capable of carrying out the functionality described herein. An example of a computer system 1400 is shown in FIG. 14.

Computer system 1400 includes one or more processors, such as processor 1404. The processor 1404 is connected to a communication infrastructure 1406 (e.g., a communications bus, cross-over bar, or network). Various software aspects are described in terms of this exemplary computer system. After reading this description, it will become apparent to a person skilled in the relevant art(s) how to implement the invention using other computer systems and/or architectures.

Computer system 1400 can include a display interface 1402 that forwards graphics, text, and other data from the communication infrastructure 1406 (or from a frame buffer not shown) for display on the display unit 1430.

Computer system 1400 also includes a main memory 1408, preferably random access memory (RAM), and may also include a secondary memory 1410. The secondary memory 1410 may include, for example, a hard disk drive 1412 and/or a removable storage drive 1414, representing a floppy disk drive, a flash drive, a magnetic tape drive, an optical disk drive, etc. The removable storage drive 1414 reads from and/or writes to a removable storage unit 1418 in a well known manner. Removable storage unit 1418 represents a floppy disk, magnetic tape, optical disk, etc. which is read by and written to by removable storage drive 1414. As will be appreciated, the removable storage unit 1418 includes a computer usable storage medium having stored therein computer software and/or data.

In alternative aspects, secondary memory 1410 may include other similar devices for allowing computer programs or other instructions to be loaded into computer system 1400. Such devices may include, for example, a removable storage unit 1422 and an interface 1420. Examples of such may include a program cartridge and cartridge interface (such as that found in video game devices), a removable memory chip (such as an erasable programmable read only memory (EPROM), or programmable read only memory (PROM)) and associated socket, and other removable storage units 1422 and interfaces 1420, which allow software and data to be transferred from the removable storage unit 1422 to computer system 1400.

Computer system 1400 may also include a communications interface 1424. Communications interface 1424 allows software and data to be transferred between computer system 1400 and external devices. Examples of communications interface 1424 may include a modem, a network interface (such as an Ethernet card), a communications port, a Personal Computer Memory Card International Association (PCMCIA) slot and card, etc. Software and data transferred via communications interface 1424 are in the form of signals 1428 which may be electronic, electromagnetic, optical or other signals capable of being received by communications interface 1424. These signals 1428 are provided to communications interface 1424 via a communications path (e.g., channel) 1426. This channel 1426 carries signals 1428 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 1414, a hard disk installed in hard disk drive 1412, and signals 1428. These computer program products provide software to computer system 1400. The invention is directed to such computer program products.

Computer programs (also referred to as computer control logic) are stored in main memory 1408 and/or secondary memory 1410. Computer programs may also be received via communications interface 1424. Such computer programs, when executed, enable the computer system 1400 to perform the features of the present invention, as discussed herein. In particular, the computer programs, when executed, enable the processor 1404 to perform the features of the present invention. Accordingly, such computer programs represent controllers of the computer system 1400.

In an aspect where the invention is implemented using software, the software may be stored in a computer program product and loaded into computer system 1400 using removable storage drive 1414, hard drive 1412 or communications interface 1424. The control logic (software), when executed by the processor 1404, causes the processor 1404 to perform the functions of the invention as described herein.

In another aspect, the invention is implemented primarily in hardware using, for example, hardware components such as application specific integrated circuits (ASICs). Implementation of the hardware state machine so as to perform the functions described herein will be apparent to persons skilled in the relevant art(s).

In yet another aspect, the invention is implemented using a combination of both hardware and software.

CONCLUSION

While various aspects of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary aspects, but should be defined only in accordance with the following claims and their equivalents.

In addition, it should be understood that the figures in the attachments, which highlight the structure, methodology, functionality and advantages of the present invention, are presented for example purposes only. The present invention is sufficiently flexible and configurable such that it may be implemented in ways other than that shown in the accompanying figures.

Further, the purpose of the foregoing Abstract is to enable the U.S. Patent and Trademark Office and the public generally, and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present invention in any way.

What is claimed is:

1. A low-cost tag useable as a virtual storage medium for multimedia information, comprising:
    (a) attaching means found on a back surface of the tag for allowing the tag to be affixed to an object;
    (b) a service description imprinted on a front surface of the tag;
    (c) a license type imprinted on said front surface of the tag; and
    (d) a unique visual identifier code imprinted on said front surface of the tag, wherein said unique visual identifier is capable of being read using a sensor enabled mobile telephone, and facilitates the storing and retrieval of multimedia information using said mobile telephone;
    wherein the tag is constructed from a low-cost material selected from the group consisting of: paper, metal, plastic and leather.

2. The low-cost tag of claim 1, further comprising:
    (e) a tag type imprinted on the said front surface of the tag, wherein said tag type is indicative of one of the following: a media tag; and a security tag.

3. The low-cost tag of claim 1, wherein said service description imprinted on said front surface of the tag is one of the following: one minute audio; single picture; multiple pictures; thirty second video; 140 char text; and 48-bit security.

4. The low-cost tag of claim 1, wherein said license type imprinted on said front surface of the tag is one of the following: single user; multi-user; and secure multi-user.

5. The low-cost tag of claim 1, wherein said unique visual identifier code is one of: a barcode; and an RFID inlay.

6. The low-cost tag of claim 1, wherein said unique visual identifier code is one of: a Data Matrix 2D barcode; a MaxiCode 2D barcode; and a QR Code 2D barcode.

7. The low-cost tag of claim 6, wherein said unique visual identifier code is created using a set of unique data variables, an application identity variable and a set of authentication data variables.

8. A method of creating a low-cost tag useable as a virtual storage medium for multimedia information, comprising the steps of:
    (a) selecting a low-cost material from the group consisting of: paper, metal, plastic, and leather; to form the tag;
    (b) placing an attaching means on a back surface of the tag which facilitates the tag being affixed to an object;
    (c) imprinting a service description on a front surface of the tag;
    (d) imprinting a license type on said front surface of the tag;
    (e) creating a unique visual identifier code; and
    (f) imprinting said unique visual identifier code on said front surface of the tag, wherein said unique visual identifier is capable of being read using a sensor enabled mobile telephone, and facilitates the storing and retrieval of multimedia information using said mobile telephone.

9. The method of claim 8, wherein said unique visual identifier code is one of: a Data Matrix 2D barcode; a MaxiCode 2D barcode; and a QR Code 2D barcode.

10. The method of claim 9, wherein said step (e) comprises the steps of:
    (i) selecting a set of at least two unique data variables;
    (ii) selecting at least one application identity variable;

(iii) generating at least one authentication data variable using said set of at least two unique data variables;
(iv) generating a cipher information code using said set of at least two unique data variables, said at least one authentication data variable, and said at least one authentication data variable; and
(v) utilizing a 2D barcode encoding process to generate said unique visual identifier code from said cipher information code.

11. The method of claim 10, wherein generating said cipher information code using said set of at least two unique data variables, said at least one authentication data variable, and said at least one authentication data variable comprises using one of the following cipher techniques: XOR cipher; One Time Pad cipher; Vernam cipher; and Vigenère cipher.

12. A low-cost tag useable as a virtual storage medium for multimedia information created in accordance with the method of claim 11.

* * * * *